July 16, 1963   T. F. BURKE   3,097,576
DEVICES FOR FORMING HINGE COVER FOLDING BOXES
Filed Sept. 18, 1961   9 Sheets-Sheet 1

INVENTOR.
Thomas F. Burke
BY Howard G. Russell
his   ATTORNEY

INVENTOR.
Thomas F. Burke
BY
Howard G. Russell
his ATTORNEY

Fig. 8

INVENTOR.
Thomas F. Burke
BY
Howard G. Russell
his ATTORNEY

July 16, 1963 T. F. BURKE 3,097,576
DEVICES FOR FORMING HINGE COVER FOLDING BOXES
Filed Sept. 18, 1961 9 Sheets-Sheet 6

Fig. 9

INVENTOR.
Thomas F. Burke
BY
Howard G. Russell
his ATTORNEY

Fig. 11

INVENTOR.
Thomas F. Burke

July 16, 1963 T. F. BURKE 3,097,576
DEVICES FOR FORMING HINGE COVER FOLDING BOXES
Filed Sept. 18, 1961 9 Sheets-Sheet 9

Fig. 12

INVENTOR.
Thomas F. Burke
BY Howard S. Russell
his ATTORNEY ent # United States Patent Office 3,097,576
Patented July 16, 1963

3,097,576
DEVICES FOR FORMING HINGE COVER
FOLDING BOXES
Thomas F. Burke, Redwood City, Calif., assignor to Atlas
General Industries, Inc., New York, N.Y., a corporation of Massachusetts
Filed Sept. 18, 1961, Ser. No. 138,773
9 Claims. (Cl. 93—49)

This invention relates to improvements in devices for producing a glued hinge cover folding box from a flat cut and scored box blank.

The invention may be considered an improvement over, or adaptation of, the known plunger-and-die type box forming machine in which a plunger moves the originally flat blank into a forming die, whereby the blank is folded about the plunger into box form, whereafter the die is contracted to subject the box, while being internally supported by the plunger, to compression in order to set the adhesive quickly to permit the box to be removed from the plunger and the die.

The invention may also be regarded as an improvement in mechanisms for forming a 6-corner glued box, so called because six separate glue bonds are formed, four at the corners of the box body and two at corners of the box cover.

It is known in this connection to employ a step-bottom plunger about which the blank is folded by the die and by a movable forming block or plate which forces the blank into the crotch or step of the plunger. For this purpose the block is slidable towards and away from the plunger as well as up and down, i.e., parallel to the plunger stroke, both motions being controlled by an actuating mechanism.

The mechanism is rather complex, comprises relatively heavy parts with attendant inertia and lost motion problems. Moreover, the device tends to roll the back wall of the box up and against the plunger by a sliding motion up the back panel towards the step crotch, rather than breaking the blank at the cover hinge line and forcing the hinge cover portion into the crotch whereby buckling and rolling of the back panel would be prevented.

The invention provides an improved mechanism in which a tiltable blade is provided in association with the die. The blade is movable into three major positions, a first position in which it faces the approaching plunger and a second position in which the blade supports the cover panel by lying parallel to the upper level or face of the plunger. In a third position the blade is swung out of the way to permit the finished box to be discharged through an enlarged die throat area.

In the first position the edge of the blade preferably meets the blank at the cover hinge line and folds the blank at that line, acting as a folding guide for the blank with resultant maintenance of the cover dimensions within very close tolerances.

As the plunger advances the blade tilts and meshes precisely with the crotch of the plunger into which the blank is drawn, rather than pushed, without the tendency of rolling any of the box panels.

The blade and its operating mechanism have little mass and move with great accuracy enabling relatively high production rates to be maintained, as inertia and lost motion problems are avoided.

These and other features and advantages of this invention will appear more fully from the detailed description which follows accompanied by drawings showing, for the purpose of illustration, a preferred embodiment of the invention. The invention also resides in certain new and original features of construction and combination of elements hereinafter set forth and claimed. Although the characteristic features of this invention which are believed to be novel will be particularly pointed out in the claims appended hereto, the invention itself, its objects and advantages, and the manner in which it may be carried out, may be better understood by referring to the following description taken in connection with the accompanying drawings forming a part of it in which:

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction incorporating the invention for the purpose of explanation of broader aspects of the invention, but it is understood that structural details may be modified in various respects without departure from the principles of the invention and that the invention may be incorporated in other structural form than shown.

The principle of this invention is most readily understood by considering the arrangement and function of principal parts of a typical box forming mechanism illustrated in the diagrammatic FIGURES 1 to 6. A box forming plunger 11 comprising a stem 12 leading to suitable mechanism for moving the plunger up and down comprises a first bottom surface 13 and a second bottom surface 14 arranged in inverted step fashion with a vertical riser portion 15 therebetween.

The upper bottom surface is designed to engage that portion of a box blank which forms the hinge cover of the box and the second or lower bottom surface 14 is designed to engage the bottom panel of a box blank which becomes the bottom of the box body. The space 16 between the riser 15 and the upper bottom surface 13 will sometimes be referred to as the step space or crotch of the plunger. As will later be seen, the cover hinge portion of the box lies within the step space or crotch, as the box is being formed.

The plunger 11 is movable into, and out of, a folding die 17 comprising a box body front wall folding member or surface 18 and other folding surfaces for folding side portions of the blank which are not shown in the diagrammatic sketches for reasons of simplicity. It will be sufficient to state that the top surface of the die permits a box blank B to be placed thereover in a condition in which the front wall panel, the bottom panel, the rear wall panel, as well as the cover top panel of the box, lie in one and the same plane prior to engagement by the plunger. This is seen, for example, in FIG. 9 later to be described.

A tilt shaft 19 extends substantially parallel to the box body front wall folding surface 18 of the die and carries a blade 20 which, by oscillation of the shaft 19 about its axis, may be swung into the die space 17 and into the crotch or step space 16 of the plunger, as the plunger descends.

A typical mechanism for producing this oscillatory or fanning motion of the blade 20 is illustrated and comprises a cam 21 on the main shaft 22 of the box machine. The shaft 22 makes one complete revolution for each box being formed. A cam follower 23 in the form of a roller is mounted on a substantially triangular lever 24 mounted for pivotal motion about a pivot axis 25. A connecting rod 26 is pivotally connected to the lever 24 at 27. Obviously, the lever 24 may have the form of a bell crank with the lever portion between 23 and 27 missing. The triangular form of lever 24 provides great rigidity combined with light weight. A biasing spring 28 tends to turn the lever 24 in a clockwise direction about the pivot axis 25 to maintain the follower 23 in contact with the cam surface.

The connecting rod 26 leads to one arm 29 of a bell crank lever 30 at 31 and a further connecting rod 32 hinged to the other arm 33 of the lever 30 extends to a lug 34 on the tilt shaft 19. The bell crank lever 30 is pivotally supported about an axis 35 and the ends of the connecting rod 32 are designated 36 and 37, respectively.

Rotation of the cam 21 causes the triangular lever 24 to rock about its axis 25 and the rocking motion is transmitted to the tilt shaft 19 through the connecting rods 26, 32 and the bell crank lever 30 between them.

The tilt shaft 19 may also be provided with a second or supplementary blade 38 extending at an angle with respect to the main blade 20. The supplementary blade may have a lip 39 on it.

The reciprocating motion of the plunger 11 is timed with respect to the main shaft 22 in a manner well known in the construction of box formers of the plunger and die type.

Figure 1:
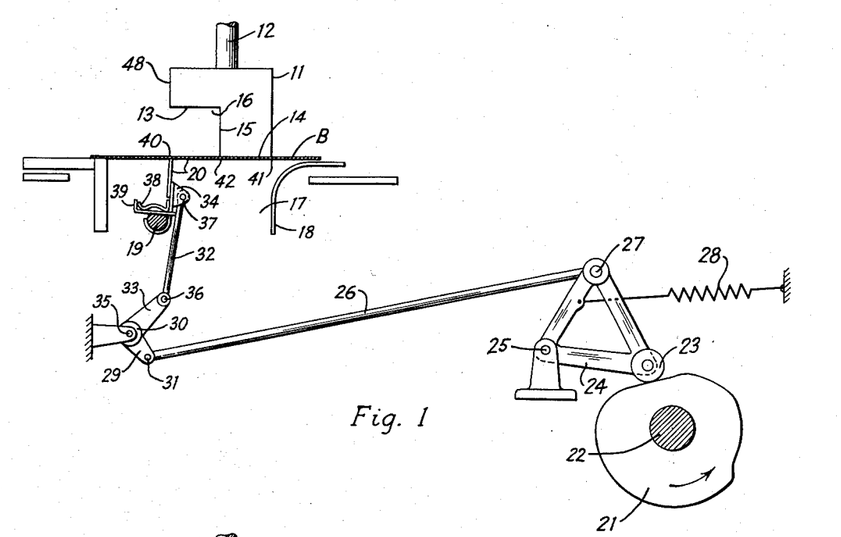
FIGS. 1 to 6 are diagrammatic illustrations of the principal structure of the box forming mechanism in 6 succeeding phases of operation.
Figure 2:
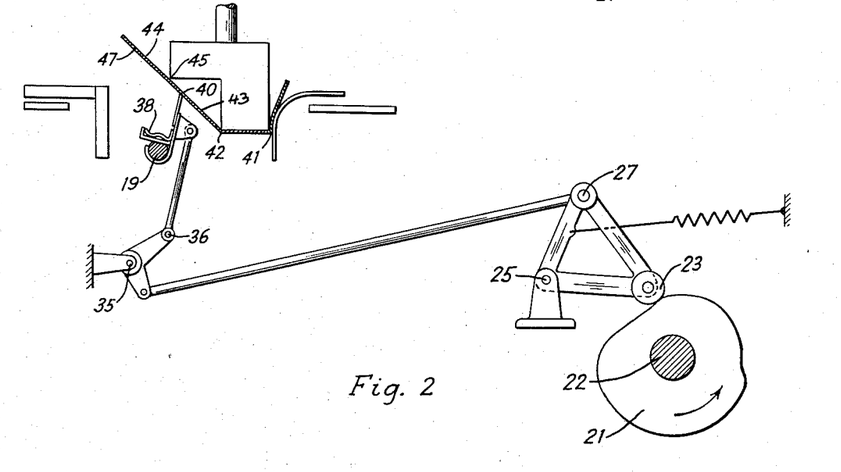
Figure 3:
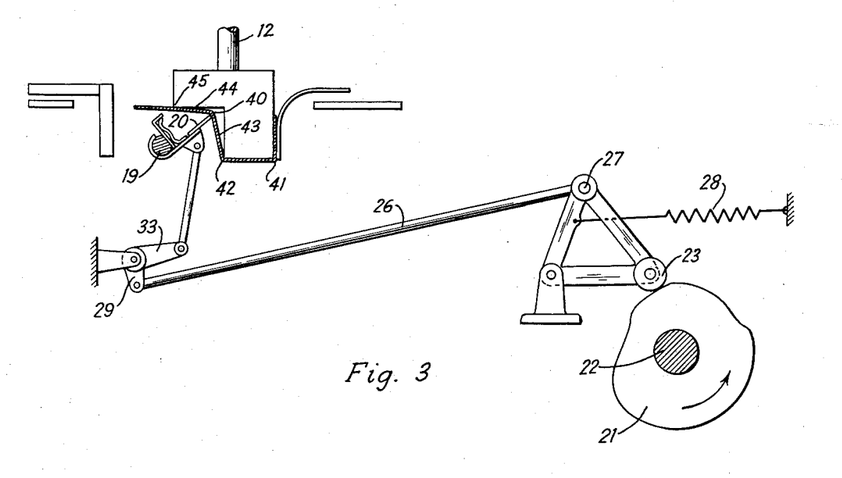

For an explanation of the operation of the illustrated mechanism it may be assumed that a blank B is placed over the die prior to descent of the plunger into the position shown in FIG. 1 in which the lower bottom surface 14 of the plunger makes contact with the blank. It will be seen that in this position the blank is not only supported by the top surface of the die, but also rests on the edge of the blade 20 which contacts the blank in line with its cover hinge line 40. Continued descent of the plunger causes the blank B to fold at bottom front and bottom rear fold lines 41 and 42, respectively, as seen in FIG. 2. The back wall panel 43 and the cover panel 44 then assume a slanted yet still unbroken position until the slanted blank portion meets the rear edge 45 of the upper bottom surface of the plunger. The blank then creases at the cover linge line 40 for which the blade 20 forms a folding guide or rule forming the cover hinge with great precision by maintaining the rear wall panel 43 and the cover panel 44 under a certain amount of tension during the phases of the motion illustrated in FIGS. 3 and 4 during which the blade forces the cover hinge into the crotch of the plunger.

Figure 4:
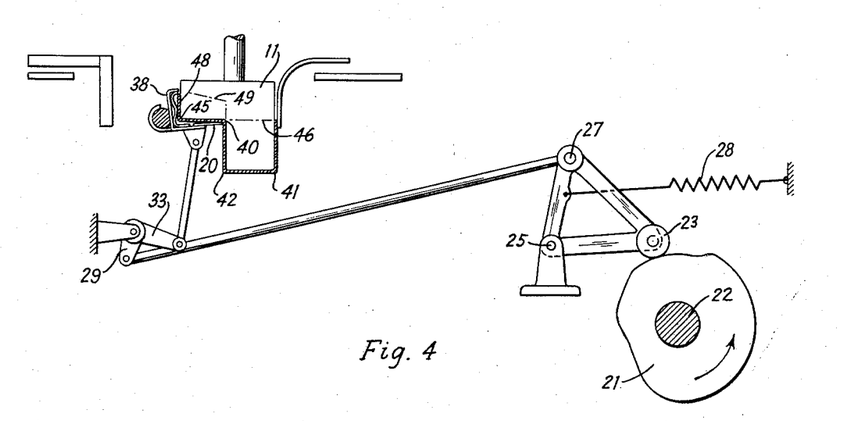
Figure 5:
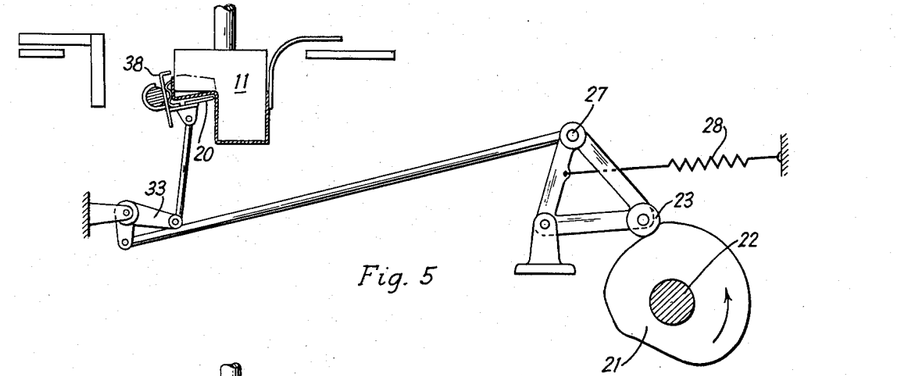

In the position shown in FIG. 4 the box body portion is fully squared and folded about the lower portion of the plunger which forms a mandrel or block for the box. The ends of the box are also folded flat against the plunger 11 in a conventional manner and by conventional means and the top edge of the box body is indicated at 46.

The supplementary blade 38 folds the cover front panel 47 against the back surface 48 of the plunger and the outline of the cover side panels is indicated at 49. In the position shown in FIG. 4 the plunger has reached its lowest position in the die, the box folding is completed and the glued box ends, both within the box body and box cover portions, are put under compression between pressure elements later to be described.

As the cam 21 continues to turn (FIG. 5), the cam follower moves into a slight depression and causes the blades 20 and 38 to back away from the plunger, and the box is being held at this moment by suitable elements to facilitate withdrawal of the plunger from it. Such elements may be a vacuum cup mechanism grasping the box bottom or latches snapping over a top edge of the box, as known in the art.

Figure 6:
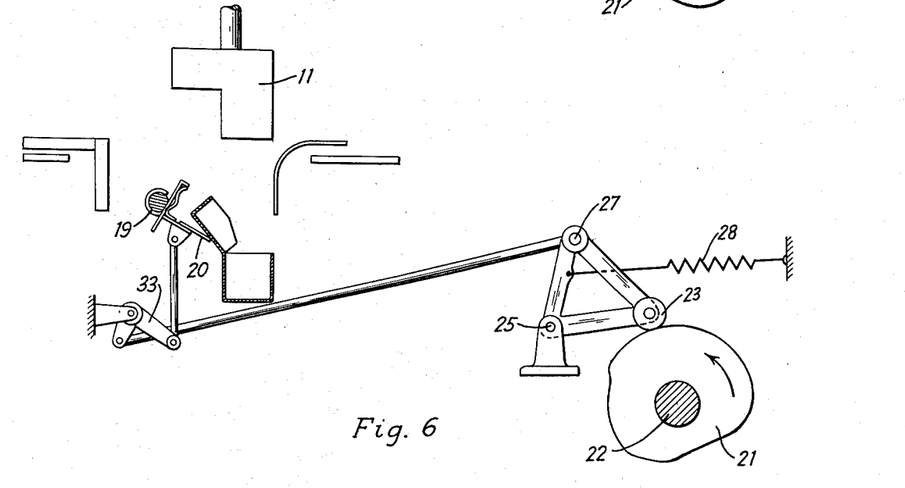

Immediately thereafter the cam follower 23 climbs onto the highest cam portion causing the tilt shaft 19 and the blade 20 to move into a downwardly slanted position as shown in FIG. 6. This facilitates removal of the formed box whose hinge cover tilts up slightly. At this phase the plunger 11 has left the die 17 completely and the next blank is about to be deposited on the die.

Figure 7:
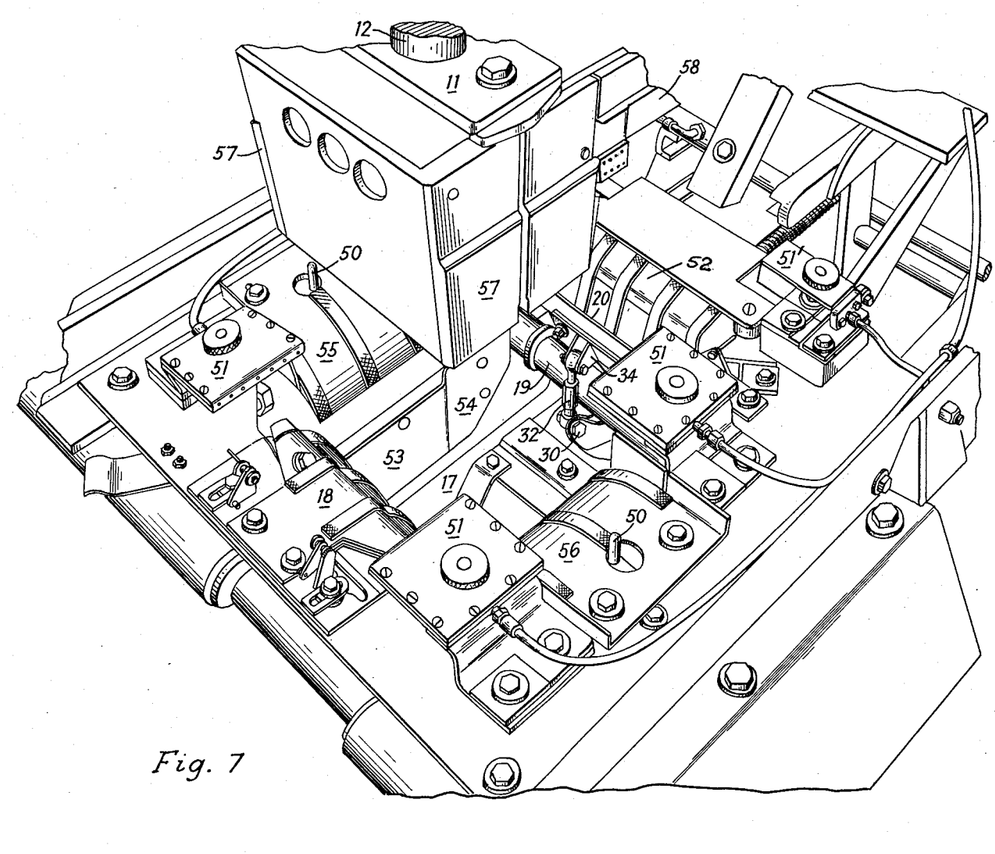
FIGS. 7 to 11 are perspective views of a box forming die, plunger, and feeder of a machine incorporating the invention.

When the cam follower reaches the lowest cam portion the blade is tilted up, as shown in FIGS. 1 and 7, to face the next blank and the descending plunger.

Turning now to details of a representative machine incorporating the invention, FIG. 7 shows the die and plunger without a blank to illustrate machine details.

The top portion of the die 17 is fitted with locating pins 50 for proper alignment of a blank with respect to the die and the plunger. Six adhesive applicators are provided, four applicators 51 for the box body portion and two applicators 51' for the box cover portion. The applicators extrude droplets of adhesive under pressure. Details of such applicators are described in the patent to Pagendarm No. 3,059,856, dated October 23, 1962.

The front panel folding element 18 lies opposite a cover panel supporting element 52. Compression surfaces 53, 54 for laterally compressing the folded box are seen in the die throat below end panel folding elements 55, 56. The surfaces 53 which compress the box body are spaced slightly less than the surfaces 54 for compressing the ends of the box cover, as the box cover is made slightly larger in order to fit over the box body. Correspondingly, the end surfaces 57 of the lower plunger portions are spaced less than the end surfaces 58 of the upper portion (see also FIG. 12).

The tilt shaft 19, blade 20, lug 34, connecting rod 32 and bell crank lever 30 are clearly visible in the interior of the die, the relative position of the parts corresponding to those in FIG. 1, the phase of operation being only slightly prior to that shown in FIG. 1.

Figure 8:
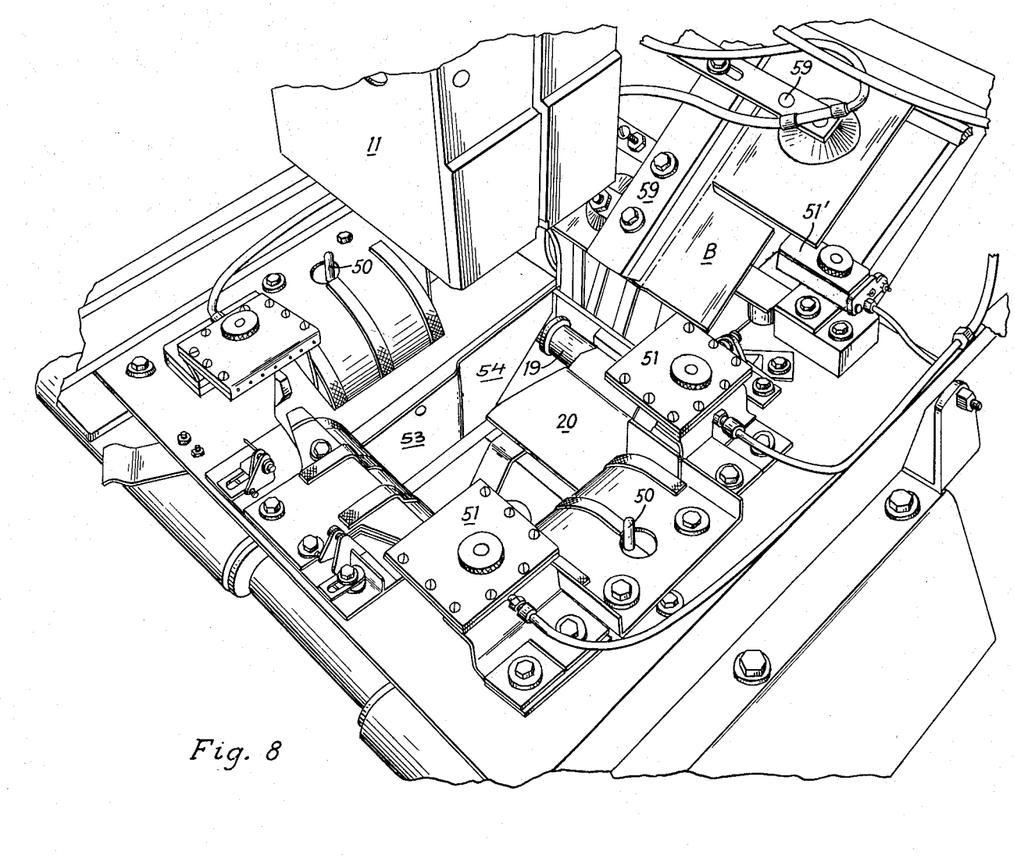

FIG. 8 presents a different phase. The plunger 11 is on its way up and the blade 20 is nearly horizontal. Just previously the blade was tilted downwardly, as in FIG. 6, to facilitate removal of the last box. Presently the blade is performing an upward motion while the vacuum blank feeder 59 is about to place a new flat blank over the die.

Figure 9:
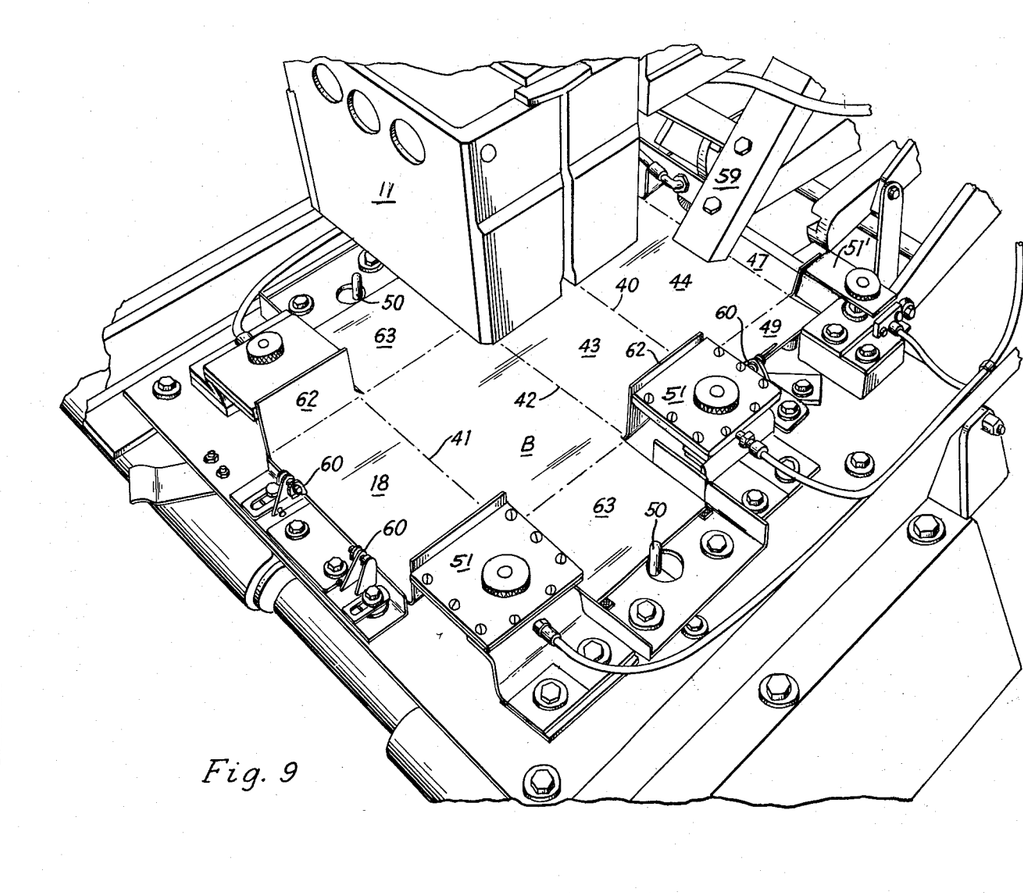

FIG. 9 shows the blank B deposited between the adhesive applicators 51 and 51' which also cause glue flaps of the blank to be folded upwardly. Catches 60 hold the blank down at this moment. The plunger 11 is approaching the blank while the feeder 59 retracts to pick up the next blank from a magazine 61 visible in FIG. 12.

Figure 10:
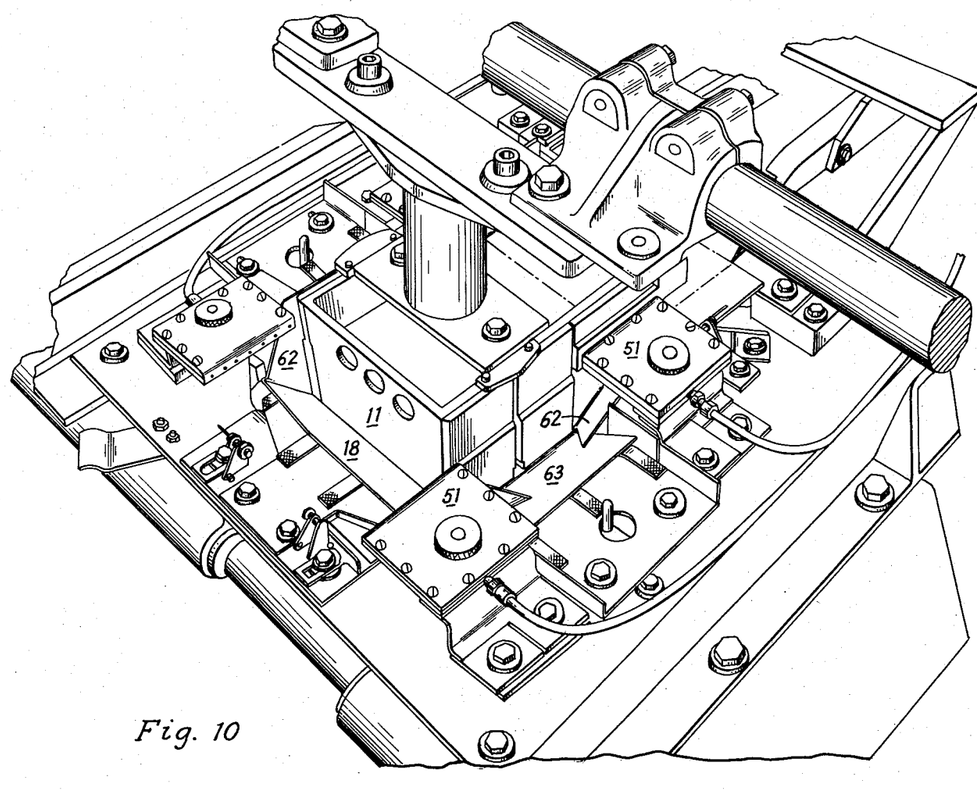

In the position shown in FIG. 10 the plunger has engaged the bottom panel of the blank and is forcing the blank into the die throat. The adhesive coated glue flaps 62 are moving inside the box body end panels 63.

Figure 11:
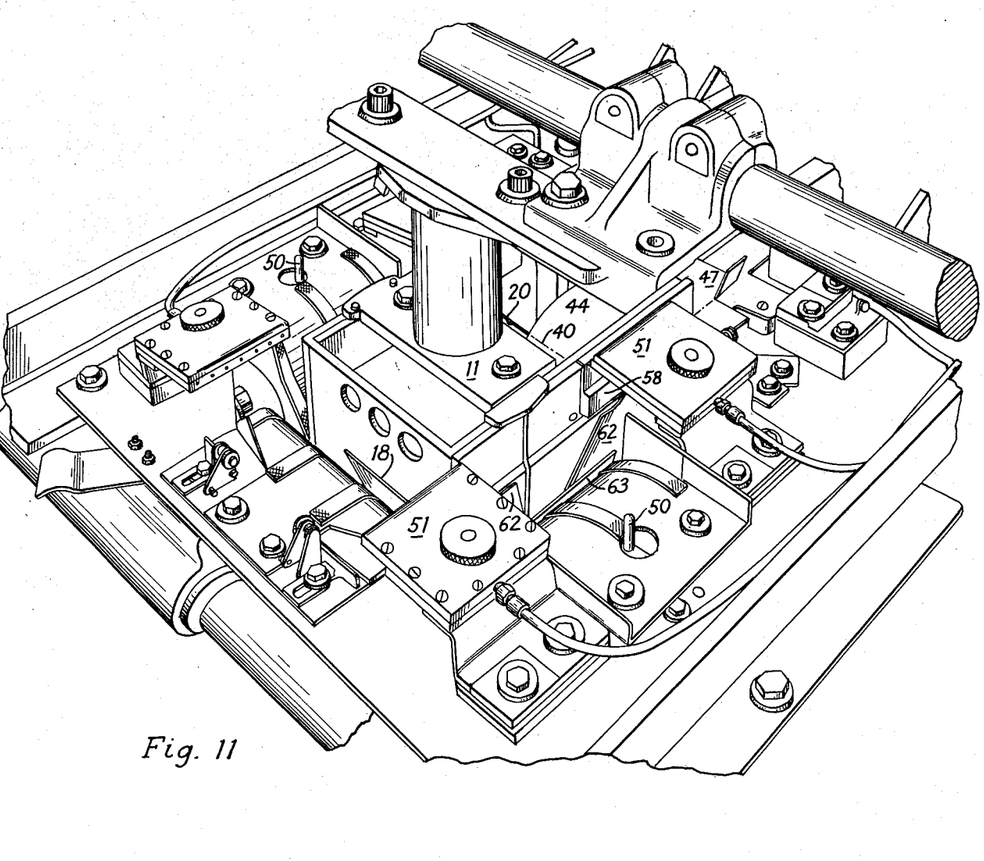

FIG. 11 shows a slightly later phase of the operation viewed from a slightly different angle. One-half of a blank was put into the machine for this view in order to show the location of the edge of the blade 20 with respect to the cover hinge line 40. The blank creases precisely at this line as the blade forces the blank into the crotch or step space 16 of the plunger. The position of the various elements in FIG. 11 corresponds approximately to that shown in FIG. 3.

Figure 12:
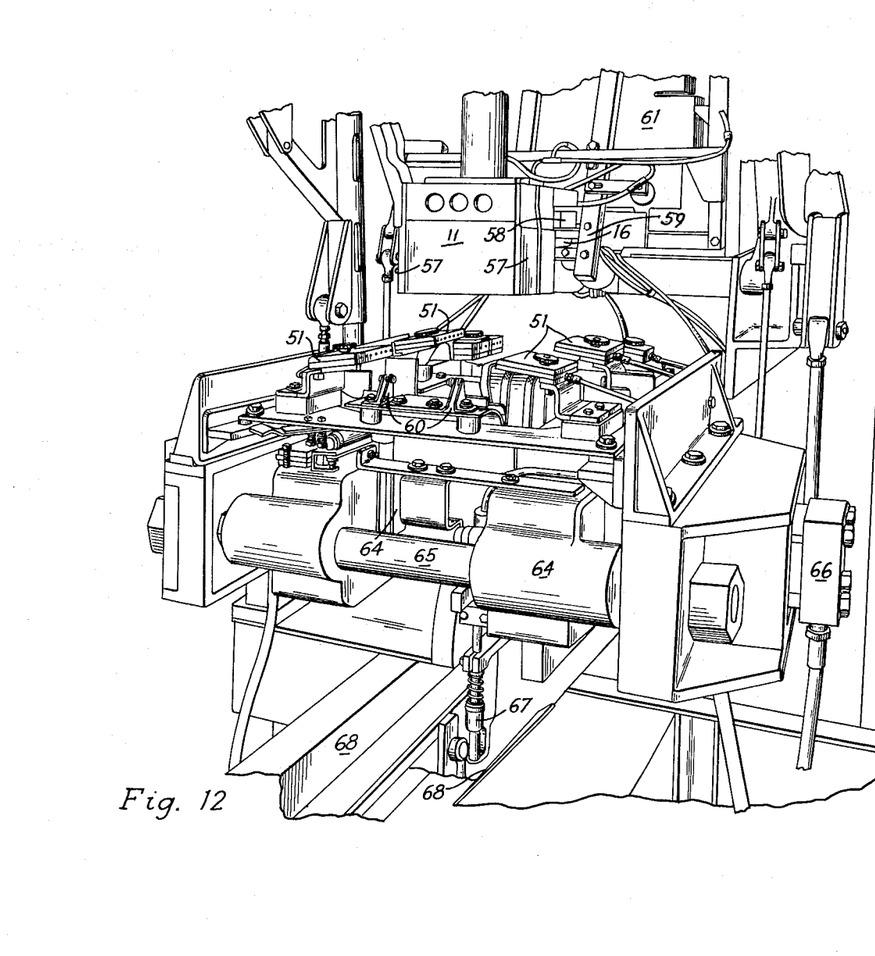
FIG. 12 is a front view of the machine shown in FIGS. 7 to 11.

FIG. 12 shows details of the box compression mechanism. The pressure plates 53, 54 are mounted on heavy jaws 64 slidable towards, and away from each other, on rods of which one is visible at 65. The end of a hydraulic cylinder for moving the jaws 64 is seen at 66.

A vacuum box stripper 67 underneath the die removes finished boxes which they drop into a chute 68 leading to the box filling station.

What is claimed is:

1. A device for forming a box blank into the shape of a folding box, the device comprising, in combination, a blank folding die comprising a lateral folding element and end folding elements, said lateral and said end folding elements defining three sides of a substantially rectangular die throat open at top and bottom, said end elements being movable relatively to each other to vary the distance between them; a step-bottom plunger movable into the die throat from the top, the step of the plunger being parallel to said lateral folding element; a folding blade mounted on said die with freedom to tilt about an axis substantially parallel to said lateral folding elements to swing into the step space and crease a portion of a plunger engaged blank and move the creased blank portion into the step space, as the plunger moves into the die; means for moving said plunger and tilting said blade in timed relationship, said blade having two major positions, a first positon in which it is substantially parallel to the plunger axis, remote from the plunger and pointed towards the die entrance as the plunger approaches the die, and a second position in which the blade is substantially normal to the plunger axis and extends into the step space when the plunger has reached the end of its stroke into the die; and power means timed with respect to said moving means for moving said end elements closer together to clamp a plunger supported blank against the plunger when the plunger has reached the end of its stroke into the die.

2. A device for forming a box blank into the shape of a hinge cover folding box, the device comprising, in combination, a pair of oppositely disposed compression elements mounted with freedom of movement towards, and away from, each other, the face surfaces of said elements being shaped to provide a first portion of greater distance and a second portion of lesser distance between them adapted to accommodate the box cover and box body portions, respectively, a lateral folding element, said compression elements and said lateral element constituting three sides of a die having a substantially rectangular die throat; a step-bottom plunger movable into and out of said throat, said plunger comprising a first portion having a first bottom surface at a higher elevation, and a second portion having a second bottom surface at a lower elevation than said first surface, the plunger being so disposed with respect to the die as to pass between the first portion of greater spacing with the first plunger portion and between the second die portion of lesser spacing with the second plunger portion; a blade-like blank folding element associated with the die and tiltable within the first die portion, said blade-like element having a blank engaging edge substantially parallel to its tilt axis, said last named element being tiltable from a first position in which the blade is substantially parallel to the die axis, and its said edge is pointed towards the die entrance towards the second plunger portion, as the plunger enters the die, to assume a second position in which the blade is substantially normal to the die axis and its edge lies in the step space of the plunger; power means for moving said plunger and said compression elements in timed relationship so as to clamp the plunger periodically between the compression elements after entry of the plunger into the die; and actuating means timed with respect to said power means for tilting said blade-like element from said first into said second position as the plunger enters the die.

3. A device for forming a box blank into the shape of a folding box, the device comprising, in combination, a pair of oppositely disposed compression elements mounted with freedom of movement towards, and away from, each other, the face surfaces of said elements being shaped to provide a first portion of greater distance and a second portion of lesser distance between them adapted to accommodate the box cover and box body portions, respectively, a lateral folding element, said compression elements and said lateral element constituting three sides of a die having a substantially rectangular die throat; a step-bottom plunger movable into and out of said throat, said plunger comprising a first portion having a first bottom surface at a higher elevation, and a second portion having a second bottom surface at a lower elevation than said first surface, the plunger being so disposed with respect to the die as to pass between the first portion of greater spacing with the first plunger portion and between the second die portion of lesser spacing with the second plunger portion; a blade within the die throat pivotally mounted about an axis substantially parallel to said lateral folding element with freedom to assume two major positions, a first position in which the blade is pointed towards the entrance of the die throat and a second position in which it lies substantially parallel to the said first bottom surface of the plunger; power means for actuating said plunger and said compression elements in timed relationship; actuating means timed with respect to said power means for tilting said blade about its axis from said first into said second position as the plunger enters the die; and an angular extension on said blade for engaging and folding a portion of the blank against that side wall of the plunger above the step.

4. A device for forming a box blank into the shape of a hinge cover folding box, the device comprising, in combination, a blank folding die; a step-bottom plunger movable into and out of the die; a blade mounted in the die with freedom to move from a position in which it is directed towards the die entrance and substantially parallel to the die axis into the step space of the plunger entering the die; and means for moving said blade in timed relationship with the plunger in such a way as to progressively move the blade closer towards the plunger and into the step space as the plunger enters the die.

5. A device for forming a box blank into the shape of a hinge cover folding box, the device comprising, in combination, a blank folding die; a step-bottom plunger movable into and out of the die, said plunger having a substantially vertical front surface against which the front panel of the box blank is to be folded and a step space at the rear into which the hinge cover portion of the blank is folded; a blade pivotally mounted in the die with freedom to swing into the step space of the plunger moving into the die, said blade having a terminal edge parallel to its pivotal axis; and means for tilting the blade towards the plunger in dependence on the movement of the plunger into the die from a first position in which its edge is pointed toward the die entrance and remote from the plunger into a second position in which the blade is substantially normal to the plunger axis and its edge rests in the step space of the plunger after the plunger has entered the die.

6. A device for forming a box blank into the shape of a hinge cover folding box, the device comprising, in combination, a blank folding die comprising a fixed lateral folding element and opposite end folding elements, said lateral and end folding elements defining three sides of a die throat open at top and bottom; a step-bottom plunger movable into the die throat from the top; a blade mounted opposite said lateral element with freedom to tilt into the step space of the plunger entering the die, said blade having a terminal edge for creasing a plunger engaged blank and to push the creased blank portion into said step space; means for tilting said blade in timed relationship with said plunger from a first position in which said edge is remote from the die axis towards a second position in which the edge lies in the step space of the plunger; and a folding element angularly disposed with respect to said blade, and movable therewith, for folding a portion of the blank against the plunger above its step.

7. A device for forming a folding box blank into the shape of a hinge cover box, the device comprising, in combination, a step-bottom plunger; a blank folding die comprising three main elements for engaging the portions of the blank forming one end, the front, and the other end of the box body, respectively; and a movable folding element having a blank engaging edge, said movable element being opposite said box front forming main element and being movable from a first position in which said edge is at a distance from said front forming main element to engage a blank on the die substantially at its cover hinge line, considering the blank in substantially flat condition, into a second position in which the distance between the said edge and the said front forming main element is reduced by substantially the vertical dimension of the back of the box to the cover hinge line; and means for moving said plunger and said movable element in timed relationship such that said edge maintains contact with the cover hinge line during the portion of the plunger movement from the moment of engagement of the plunger with the blank until the completion of the folding of the box body front and back into erected position.

8. A device for forming a folding box blank into the shape of a hinge cover box, the device comprising, in combination, a step-bottom plunger; a blank folding die comprising three main elements for engaging the portions of the blank forming one end, the front, and the other end of the box body, respectively; and a movable substantially blade shaped folding element having a terminal blank engaging edge, said movable element being opposite said box front forming main element and movable from a first upwardly pointed position in which its edge is spaced from the box front forming main element by a distance substantially equal to the dimension of the box bottom from front to back plus the vertical dimension of the box rear wall to said cover hinge line, to a second position in which the said edge engages the step space of the plunger and lies closer to said box front forming main element by the said vertical dimension of the box rear wall.

9. A device for forming a folding box blank into the shape of a hinge cover box, the device comprising, in combination, a step-bottom plunger; a blank folding die comprising three main elements for engaging the portions of the blank forming one end, the front, and the other end of the box body, respectively; and a movable folding element having a blank engaging edge, said movable element being opposite said box front forming main element and being movable from a first position in which said edge engages a blank on the die substantially at its cover hinge line, considering the blank in substantially flat condition, into a second position in which the edge supported hinge of the blank lies in the step space of the plunger; and means for moving said movable element in timed relationship with the plunger movement such that the said edge remains in supporting contact with said hinge while the blank is being folded at said hinge as it enters the step space of the plunger.

References Cited in the file of this patent
UNITED STATES PATENTS

| | | |
|---|---|---|
| 2,697,968 | Cote et al. | Dec. 28, 1954 |
| 2,872,855 | Fahrenkrug | Feb. 10, 1959 |
| 2,882,803 | Lloyd | Apr. 21, 1959 |